(12) United States Patent
Hirschman et al.

(10) Patent No.: US 9,325,663 B2
(45) Date of Patent: Apr. 26, 2016

(54) DISCOVERY OF NETWORK ADDRESS ALLOCATIONS AND TRANSLATIONS IN WIRELESS COMMUNICATION SYSTEMS

(71) Applicant: Sprint Communications Company L.P., Overland Park, KS (US)

(72) Inventors: Charles Brent Hirschman, Overland Park, KS (US); Lyle T. Bertz, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 14/486,774

(22) Filed: Sep. 15, 2014

(65) Prior Publication Data

US 2016/0080313 A1    Mar. 17, 2016

(51) Int. Cl.
*H04L 12/28* (2006.01)
*H04L 29/12* (2006.01)

(52) U.S. Cl.
CPC ........ *H04L 61/2007* (2013.01); *H04L 61/6059* (2013.01)

(58) Field of Classification Search
CPC ........ H04W 80/04; H04W 8/26; H04L 12/56; H04L 2012/56; H04L 29/06163; H04L 12/5601; H04L 45/50; H04L 2012/5665; H04L 12/66; H04L 2012/46; H04L 2012/5618; H04L 12/46
USPC .............. 370/349, 389, 395.5, 401, 402, 466, 370/469
See application file for complete search history.

(56) References Cited

U.S. PATENT DOCUMENTS

| 6,822,957 | B1 | 11/2004 | Schuster et al. |
| 7,526,562 | B1 * | 4/2009 | Samprathi ......... H04L 29/12066 370/466 |
| 8,301,753 | B1 * | 10/2012 | Melvin ................. H04L 61/103 709/224 |

(Continued)

FOREIGN PATENT DOCUMENTS

| CN | 101674288 | 3/2010 |
| CN | 103 581 350 A | 2/2014 |
| WO | 2013120356 | 8/2013 |
| WO | 2013170698 | 11/2013 |

OTHER PUBLICATIONS

Wing, D. et al., "Port Control Protocol (PCP); RFC6887.txt", Internet Engineering Task Force, IETF; Standard, Internet Society (ISOC) 4, Rue des Falaises CH-1205 Geneva, Switzerland, Apr. 30, 2013, pp. 1-88, XP015090359, [retrieved on Apr. 30, 2013] Chapters 1 and 2.

(Continued)

*Primary Examiner* — Brenda H Pham

(57) ABSTRACT

A communication network allocates internal Internet Protocol (IP) addresses to wireless communication devices and translates between external IP addresses and the internal IP addresses to transfer data communications between the wireless communication devices and data communication systems. The communication network receives discovery requests for the wireless communication devices and responsively transfers discovery responses describing the IP address allocations and translations for individual wireless communication devices. The communication network receives content delivery footprint data indicating the IP address allocations and translations for the wireless communication devices and transfers the content delivery footprint data to a content distribution network.

20 Claims, 6 Drawing Sheets

(56) References Cited

U.S. PATENT DOCUMENTS

| | | |
|---|---|---|
| 8,509,241 B2 | 8/2013 | Li et al. |
| 8,576,846 B2 | 11/2013 | Kumar et al. |
| 8,665,873 B2 | 3/2014 | Sarikaya et al. |
| 2005/0201391 A1* | 9/2005 | Ma .................... H04L 29/12367 370/401 |
| 2006/0187912 A1* | 8/2006 | Schwartz .......... H04L 29/12009 370/389 |
| 2007/0078986 A1* | 4/2007 | Ethier ................. H04L 65/1069 709/227 |
| 2012/0005372 A1 | 1/2012 | Sarikaya et al. |

OTHER PUBLICATIONS

Bertz, Lyle, "PCP Extensions for Footprint Discovery IETF 90, Toronto, CA", Aug. 26, 2014, pp. 1-3, XP055228117, Retrieved from the Internet: URL:http://www.ietf.org/proceedings/interim/2014/08/26/pcp/slides/slides-interim-2014-pcp-1-0.pdf [retrieved on Nov. 12, 2015] the whole document.

Anonymous: "STUN—Wikipedia, the free encyclopedia", Aug. 25, 2014, pp. 1-3, XP055228127, Retrieved from the Internet: URL:https://en.wikipedia.org/w/index.php?title=STUN&oldid=622719713 [retrieved on Nov. 12, 2015] the whole document.

* cited by examiner

DISCOVERY OF NETWORK ADDRESS ALLOCATIONS AND TRANSLATIONS IN WIRELESS COMMUNICATION SYSTEMS

TECHNICAL BACKGROUND

Communication networks use the Internet Protocol (IP) to exchange data communications, such as messages, media content, software, data files, and the like. The IP protocol employs network addresses to route IP packets between communication endpoints. The IP addresses comprise strings of characters separated by periods. One portion of the IP address indicates a network or subnetwork and another portion of the IP address indicates a host or endpoint. The network/subnetwork portion of the IP address is called a prefix. Currently, IP Version 4 (IPv4) and IP Version 6 (IPv6) are used and each has different addressing characteristics.

IP networks use various techniques to allocate IP addresses to users. The Dynamic Host Configuration Protocol (DHCP) is often used to allocate IP addresses to requesting users. The IP networks also associate alphabetic names with the IP addresses using Domain Name Systems (DNS) to convert between the easier-to-remember names and the IP addresses. Furthermore, the IP networks use Network Address Translation (NAT) systems to convert between IP addresses. NAT systems provide firewall services by converting between private and public IP addresses. NAT systems also provide compatibility services by converting between IPv6 and IPv4 addresses.

Wireless communication networks, such as Long Term Evolution (LTE) systems, provide mobile IP access to phones, computers, media players, and the like. The wireless networks allocate IP addresses using DHCP and other protocols. The wireless networks convert between names and IP addresses using DNS servers. The wireless networks translate between IP addresses and protocols using NAT systems. For example, an LTE NAT may use prefixes to translate between external public IPv4 addresses and internal private IPv6 addresses.

In many cases, multiple IP address translations may occur within the wireless network between the end-user device and the external networks. For example, devices may communicate through one another in a tethering fashion that may result in a series of address translations. Larger end-user systems in schools, hospitals, residences, and businesses may add various NAT layers to their IP communication paths. In addition, a given end-user device may have multiple parallel IP paths—each having its own set of IP translations. For example, a wireless phone may have simultaneous IP connections over LTE networks, Wireless Fidelity (WiFi) systems, Ethernet networks, Data Over Cable Service Interface Specification (DOCSIS) links, and the like.

The Port Control Protocol (PCP) enables a host on an IP network to control the NAT systems between it and its clients. PCP allows the host to efficiently control and maintain IP connectivity for the various client systems on the external side of the NAT. PCP has been adapted to allow the host to discover NAT64 translations. In particular, PCP allows a host to identify the IPv6 prefix that is used to convert between its internal IPv6 domain and its external IPv4 address. Unfortunately, PCP does not enable wireless communication devices to efficiently and effectively discover their network address allocations and translations in more complex IP systems.

TECHNICAL OVERVIEW

A communication network allocates internal Internet Protocol (IP) addresses to wireless communication devices and translates between external IP addresses and the internal IP addresses to transfer data communications between the wireless communication devices and data communication systems. The communication network receives discovery requests for the wireless communication devices and responsively transfers discovery responses describing the IP address allocations and translations for individual wireless communication devices. The communication network receives content delivery footprint data indicating the IP address allocations and translations for the wireless communication devices and transfers the content delivery footprint data to a content distribution network.

DETAILED DESCRIPTION

Figure 1:
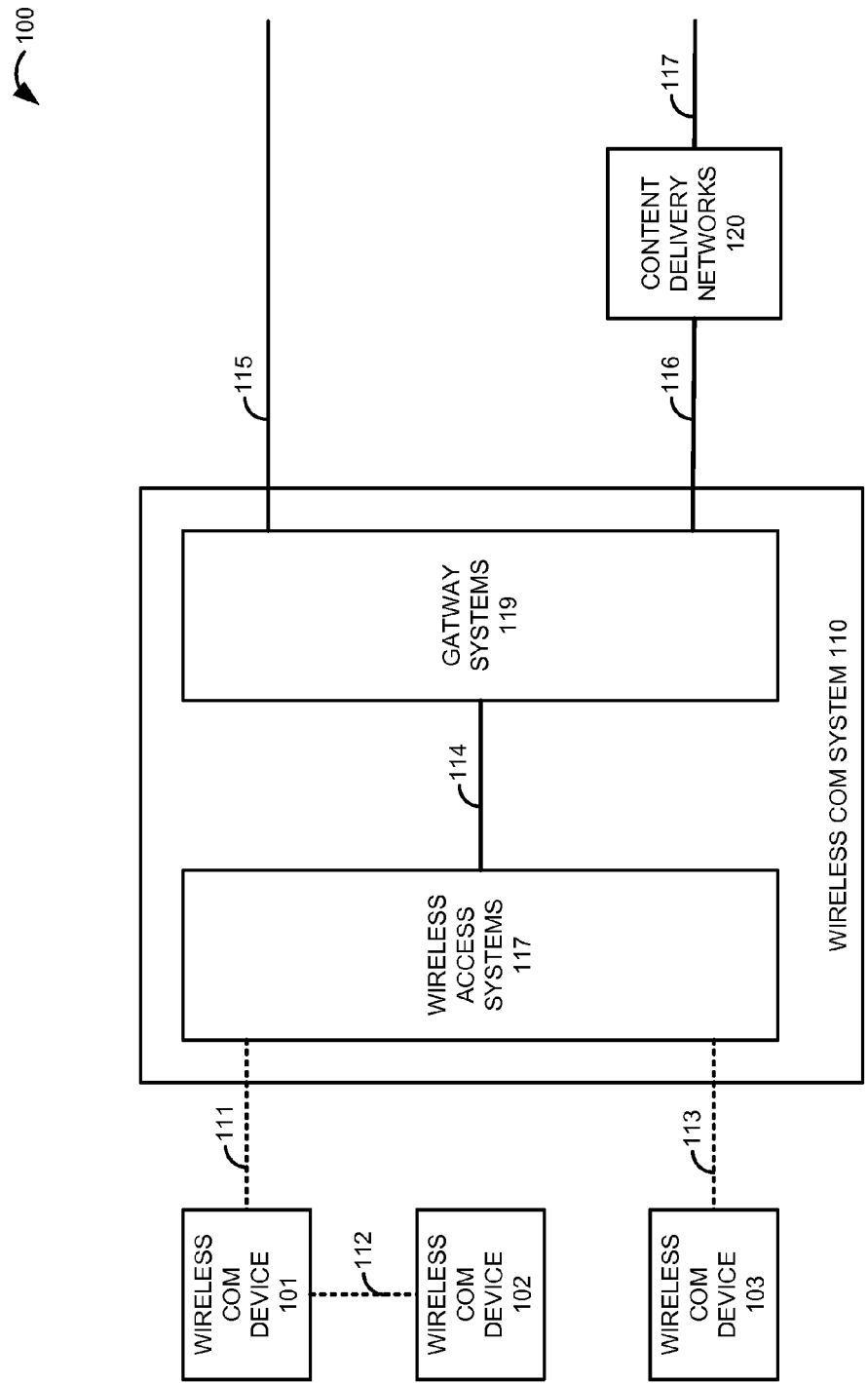
FIGS. 1-3 illustrate a communication network to discover and report IP address allocation and translation data for individual wireless communication devices in content delivery footprint information.
Figure 2:
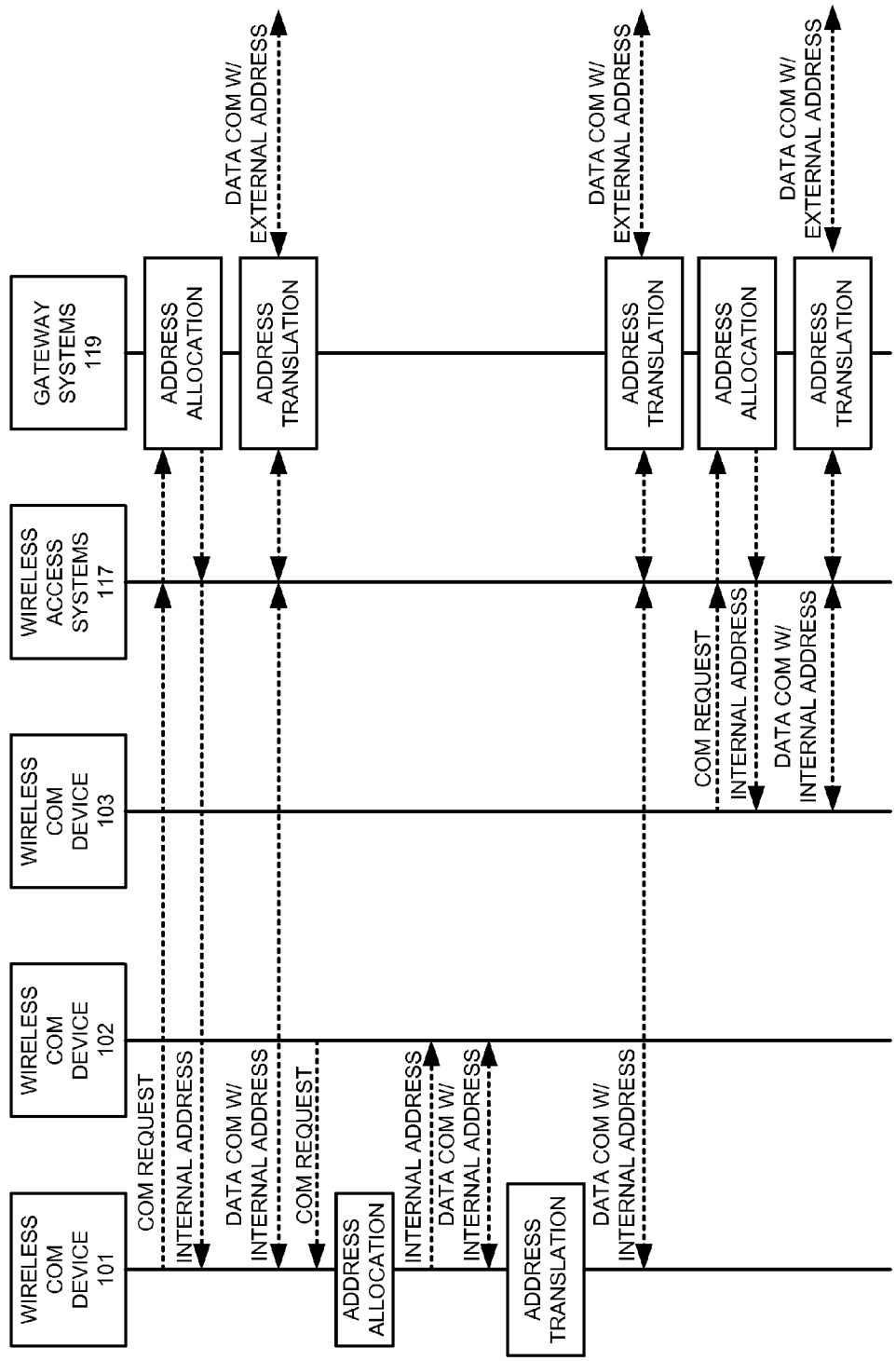
Figure 3:
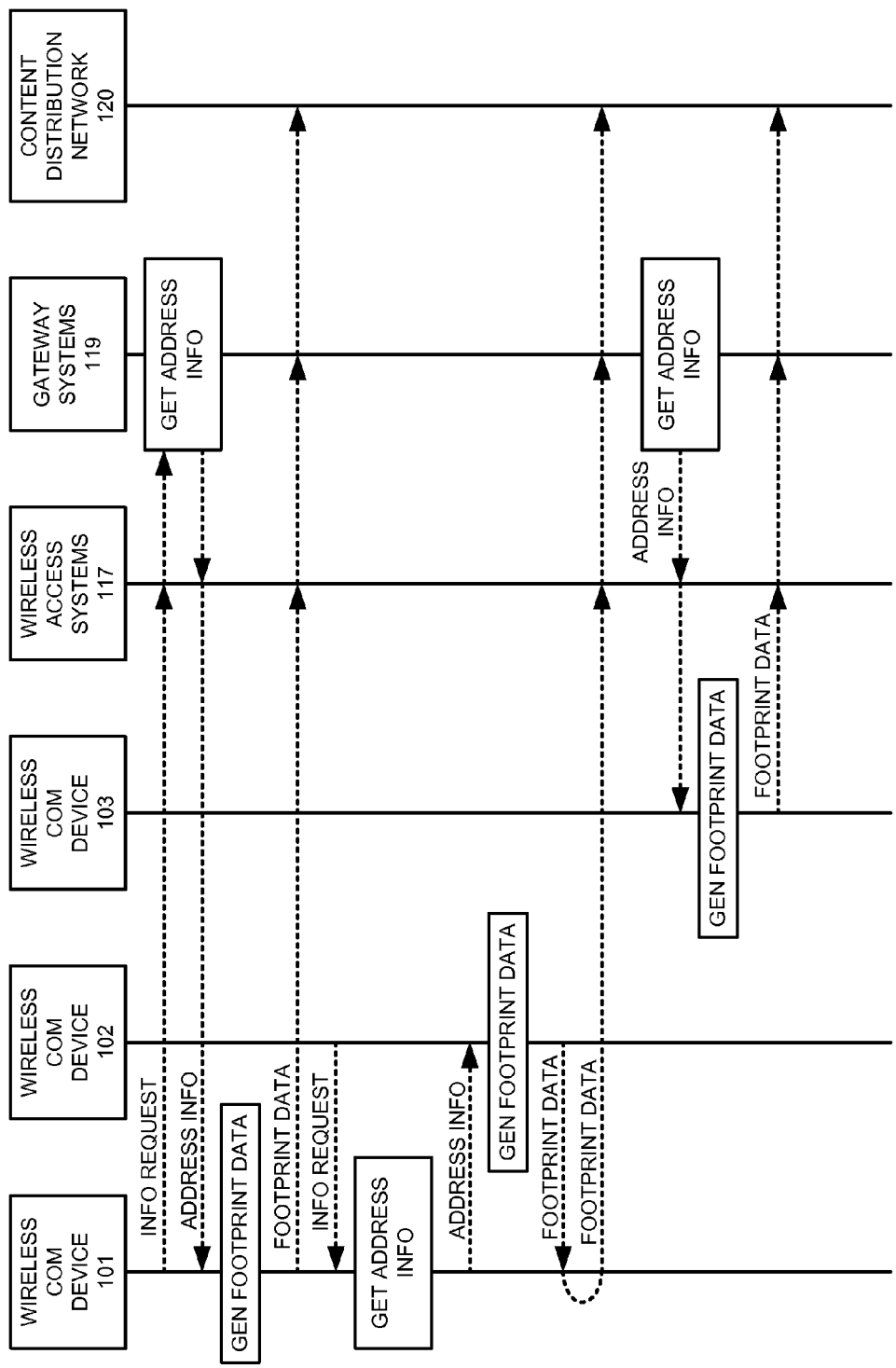

FIGS. 1-3 illustrate communication network 100 to discover the network address allocations and translations used in wireless communication system 110. Communication network 100 comprises wireless communication devices 101-103, wireless communication system 110, and content delivery networks 120. Wireless communication system 110 comprises wireless access systems 117 and gateway systems 119. Wireless communication network 100 uses the Internet Protocol (IP) to exchange media content, such as video, audio, data files, messages, digital objects, and the like. Wireless communication system 110 includes various IP systems, such as IP routers, Dynamic Host Configuration Protocol (DHCP) servers, Domain Name System (DNS) servers, Network Address Translators (NATs), firewalls, border controllers, and the like.

Wireless communication device 101 and wireless access systems 117 communicate over wireless communication link 111. Wireless communication device 102 and wireless access systems 117 communicate over wireless communication device 101 and wireless communication links 111-112. Thus, wireless communication device 102 is tethered to wireless communication system 110 through wireless communication device 101. Wireless communication device 103 and wireless access systems 117 communicate over wireless communication link 113. Wireless access systems 117 and gateway systems 119 communicate over network communication links 114. Gateway systems 119 and external data systems communicate over communication links 115. Gateway systems 119 and content delivery networks 120 communicate over communication links 116. Content delivery networks 120 and external data systems communicate over communication links 117.

Wireless communication devices 101-103 comprise mobile phones, portable computers, media players, gaming consoles, televisions, and/or some other apparatus having a wireless communication transceiver. Wireless access system 110 comprises Wireless Fidelity (Wifi) nodes, Long Term Evolution (LTE) equipment, and/or some other wireless network elements. Content data networks 120 comprise media servers, databases, controllers, and/or some other media distribution systems.

Wireless access systems 117 comprise base stations, hotspots, femtocells, relays, and/or some other wireless data nodes. Gateway systems 119 comprise Packet Data Network Gateways (P-GWs), Service Gateways (S-GWs), Media Gateways (M-GWs), Local Gateways (L-GWs) and/or some other data processing systems. In some examples, portions of wireless access systems 117 and/or gateway systems 119 reside on-site with wireless communication devices 101-103. Wireless communication links 111-113 use LTE, WiFi, and/or some other wireless communication protocol. Network communication links 114-117 use IP, Ethernet, Diameter, Session Initiation Protocol (SIP), LTE, and/or some other data communication protocol.

In operation, wireless communication network 100 allocates internal IP addresses to wireless communication devices 101 and 103 for use within wireless access systems 117, gateway systems 119, and links 111-114. Wireless communication device 101 allocates an internal IP address to wireless communication device 102 use over link 112. Wireless communication devices 101-103 and gateway systems 119 transfer data communications using the internal IP addresses. Gateway systems 119 and content delivery networks 120 (and other data communication systems) transfer the data communications using external IP addresses. Gateway systems 119 translate between the internal IP addresses and the external IP addresses to facilitate the data transfers. Wireless communication device 101 translates between internal IP addresses to facilitate the data transfers for wireless communication device 102.

Communication network 100 receives discovery requests for wireless communication devices 101-103. In response, communication network 100 transfers discovery responses describing the IP address allocations and translations for individual wireless communication devices 101-103. In some examples, wireless communication devices 101-103 transfer the discovery requests. In other examples, discovery systems in wireless communication system 110 operate as proxies to handle the discovery requests and responses for groups of wireless devices. In some examples, gateway systems 119 receive the discovery requests and transfer the discovery responses. In other examples, the discovery systems operate as proxies to handle the discovery requests and responses for groups of gateways. Thus, the discovery systems may obtain and distribute the individual IP address allocation and translation information to the appropriate wireless communication devices 101-103. In some examples, allocation/translation updates are automatically pushed to wireless communication devices 101-103 when the allocation or translation data changes for associated IP addresses, prefixes, pools, subnets, and the like.

Wireless communication devices 101-103 process the discovery responses to generate content delivery footprint data indicating the IP address allocation and translation information. The content delivery footprint data typically indicates media content and content metadata as well. Wireless communication network 100 receives the content delivery footprint data indicating the IP address allocations and translations for individual wireless communication devices 101-103. Communication network 100 transfers the content delivery footprint data indicating the IP address allocation and translation information for wireless communication devices 101-103 to content distribution networks 120.

The IP allocation information characterizes the address allocation mechanism used by a given IP system, such as a packet gateway, home agent, wifi access point, and the like. The IP allocation information may indicate the protocols, criteria, pools, and/or some other pertinent address distribution data. The allocation protocols comprise Dynamic Host Control Protocol (DHCP), IPv4 Mobility, IPv6 Mobility, and/or some other IP address allocation schemes. The allocation criteria comprises locations, subnet masks, domain names, access point names, cell identifiers, base station identifiers, and/or some other IP networking data.

The IP translation information characterizes the address translation mechanism used by a given IP system, such as a packet gateway, home agent, wifi access point, and the like. The IP translation information associates the internal addresses and pools used within wireless communication system 110 with the external addresses and pools used outside of wireless communication system 110. The translation data typically indicates the protocols, prefixes, prefix sizes, addresses, and/or some other address mapping information.

The discovery requests indicate the need for IP allocation and/or translation data for individual addresses, prefixes, pools, subnets, and the like. The discovery responses indicate the requested items, such as allocation protocol, allocation criteria, allocation pool, translation protocols, translation prefixes, translation prefix sizes, translation addresses, and/or some other IP address mapping information. An exemplary discovery response may indicate allocation data, such as "IPv4 Mobility; example.service.com; 192.3.2.0/24." An exemplary discovery response may indicate translation data, such as "ran v6 prefix=aa.bb.cc.dd/32; nat v4 prefix=124.202.232.0/24."

Gateway systems 119 may use IPv6 network prefixes to translate between internal IPv6 addresses and external IP IPv4 addresses for wireless communication device 103. The discovery requests may indicate the need for the IPv6 prefix used for wireless communication device 103 or its subnet/pool. The discovery responses might then indicate the IPv6 prefix and the external IPv4 address used for wireless communication device 103. Subsequently, the content delivery footprint data indicates the internal IPv6 prefix and external IPv4 address associated with wireless communication device 103.

Likewise, gateway systems 119 may use IPv4 network prefixes to translate between internal IPv4 addresses and external IP IPv4 addresses for wireless communication device 103. The discovery requests may indicate the need for the IPv4 prefix used for wireless communication device 103 or its subnet/pool. The discovery responses might then indicate the IPv4 prefix and the external IPv4 address used for wireless communication device 103. Subsequently, the content delivery footprint data indicates the internal IPv4 prefix and external IPv4 address associated with wireless communication device 103.

In another example, gateway systems 119 may use IPv6 network prefixes to translate between internal IPv6 addresses and external IP IPv6 addresses for wireless communication device 103. The discovery requests may indicate the need for the IPv6 prefix used for wireless communication device 103 or its subnet/pool. The discovery responses might then indicate the IPv6 prefix and the external IPv6 address used for wireless communication device 103. Subsequently, the content delivery footprint data indicates the internal IPv6 prefix and external IPv6 address associated with wireless communication device 103.

In some examples, a network element discovery process is used to identify the individual allocation and translation network elements in gateway systems 119 that serve wireless communication devices 101-103. Wireless communication device 101 may query a database to retrieve a list of network elements that perform IP address allocations or translations for wireless communication device 101. If discovery systems are used as proxies, then the discovery system for wireless communication device 101 may query the database to identify the discovery system that serves the address allocating/translating systems for wireless communication device 101. Wireless device 101 (or its proxy) would then transfer discovery requests to the address allocation/translation network elements (or their proxies) to retrieve the address allocation and translation information for the content delivery footprint data.

The operations of communication network 100 are discussed below with reference to FIG. 2. Wireless communication device 101 transfers a communication request to wireless access systems 117, and access systems 117 transfer the request to gateway systems 119. The communication request comprises a network attachment, system registration, session request, and/or some other communication signaling. In response to the communication request, gateway systems 119 allocate an internal IP address to wireless communication device 101. The allocation typically uses an allocation protocol to select an address based on various criteria. For example, gateway systems 119 may use the IPv6 mobility protocol to select an IPv6 address for wireless communication device 101 based on an access point name identified for device 101 during wireless system registration. Gateway systems 119 transfer the internal IP address through wireless access systems 117 to wireless communication device 101 for subsequent usage.

Wireless communication device 101 then exchanges data communications having the internal IP address with wireless access systems 117, and access systems 117 exchange the data communications having the internal IP address with gateway systems 119. Gateway systems 119 exchange the data communications with external systems using a different external IP address. Thus, gateway systems 119 translate between the external IP address and the internal IP address to facilitate the data communication transfer. The translation may entail a full address translation, prefix modification, protocol change, and/or some other address mapping procedure.

Wireless communication device 102 transfers a communication request to wireless communication device 101. The communication request comprises a network tethering set-up where wireless communication device 102 communicates through wireless communication device 101 to reach wireless access systems 117 and beyond. In response to the communication request, wireless communication device 101 allocates an internal IP address to wireless communication device 101—perhaps an IP port number for the internal IP address of device 101. Wireless communication device 101 transfers the internal IP address to wireless communication device 102 for subsequent usage.

Wireless communication device 102 then exchanges data communications having the internal IP address with wireless communication device 101. Wireless device 101 exchanges the data communications using its own internal IP address to wireless access systems 117. Thus, wireless communication device 101 translates between the internal address issued to wireless communication device 102 and its own internal address. Wireless access systems 117 exchange the data communications with gateway system 119. Gateway systems 119 exchange the data communications with external systems using a different external IP address. Thus, gateway systems 119 translate between the external IP address and the internal IP address to facilitate the data communication transfer. The translations in wireless device 101 and gateway systems 119 may entail a full address translation, prefix modification, protocol change, and/or some other address mapping procedure.

Wireless communication device 103 transfers a communication request to wireless access systems 117, and systems 117 transfer the request to gateway systems 119. In response to the communication request, gateway systems 119 allocate an internal IP address to wireless communication device 103. Gateway systems 119 transfer the internal IP address through wireless access systems 117 to wireless communication device 103. Wireless communication device 103 then exchanges data communications having the internal IP address with wireless access systems 117, and access systems 117 exchange the data communications having the internal IP address with gateway systems 119. Gateway systems 119 translate between the external IP address and the internal IP address to exchange the data communications with external systems.

The operations of communication network 100 are discussed below with reference to FIG. 3. Wireless communication device 101 transfers an information request to wireless access systems 117, and systems 117 transfer the request to gateway systems 119. The information request is to discover IP address allocation and translation information. In response to the information request, gateway systems 119 retrieve IP allocation and translation information for wireless communication device 101. This information retrieval may entail NAT queries and the like. The allocation information may indicate an allocation protocol, pool, and criteria used to select IP addresses for wireless communication device 101. The translation information may indicate an internal IP prefix and an external IP address for wireless communication device 101. Gateway systems 119 transfer the IP address information through wireless access systems 117 to wireless communication device 101.

Wireless communication device 101 generates content delivery footprint data including the discovered IP allocation and translation data. The content delivery footprint data may also indicate media content hosted by device 101 and associated metadata. The content delivery footprint data further indicates the tethered connection to wireless communication device 101 and its IP allocation and translation information. Wireless communication device 101 transfers the content delivery footprint data to content distribution networks 120 over wireless access systems 117 and gateway systems 119.

In an alternative, a proxy data processing system may perform the discovery process for wireless communication device 101 to provide the IP address allocation and translation data to internal devices or external systems. Likewise, the proxy data processing system may generate and transfer the content delivery footprint data on behalf of wireless communication device 101.

Wireless communication device 102 transfers an information request to wireless communication device 101. The information request comprises an IP address discovery request for allocation and translation information. In response to the information request, wireless communication device 101 retrieves IP allocation and translation information for wireless communication device 102. This information retrieval may entail NAT queries and the like, such as discovery queries to gateway system 119. The allocation information may indicate an allocation protocol, pool, and criteria used to select IP addresses for wireless communication devices 101 and 102. The translation information may indicate an internal prefixes and external prefixes for wireless communication devices 101 and 102. Wireless communication device 101 transfers the IP address information to wireless communication device 102. Note that the IP address information indicates both the IP translation in wireless communication device 101 and also the IP translation in gateway systems 119. Additional layers of IP address translation could be discovered in this manner.

Wireless communication device 102 generates content delivery footprint data which indicates the IP translation through wireless communication device 101 and the IP allocation and translation in gateway systems 119. The content delivery footprint data may also indicate the media content hosted by device 102 and associated content metadata. Wireless communication device 102 transfers the content delivery footprint data to content distribution networks 120 over wireless communication device 101, wireless access systems 117, and gateway systems 119.

In an alternative, wireless communication device 101 may perform the discovery process for wireless communication device 102 to provide the IP address allocation and translation data to internal devices or external systems. Likewise, wireless communication device 101 may generate and transfer of the content delivery footprint data on behalf of wireless communication device 102.

For wireless communication device 103, gateway systems 119 automatically perform an IP discovery to obtain the allocation and translation information for device 103. This information discovery may entail NAT queries and the like. The allocation information may indicate an allocation protocol, pool, and criteria used to select IP addresses for wireless communication device 103. The translation information may indicate an internal prefix and an external prefix for wireless communication device 103. Gateway systems 119 push the IP address information through wireless access systems 117 to wireless communication device 103.

Wireless communication device 103 generates content delivery footprint data including the discovered IP allocation and translation data. The content delivery footprint data may also indicate media content hosted by device 103 and associated metadata. Wireless communication device 103 transfers the content delivery footprint data to content distribution networks 120 over wireless access systems 117 and gateway systems 119.

In an alternative, a proxy data processing system may perform the discovery process for gateway systems 119 on behalf of wireless communication device 101 to provide the IP address allocation and translation data to internal devices or external systems. In an alternative, a proxy data processing system may perform the discovery process for wireless communication device 102 to provide the IP address allocation and translation data to internal devices or external systems. Likewise, gateway systems 119 or the proxy data processing system may generate and transfer the content delivery footprint data on behalf of wireless communication device 103.

Figure 4:
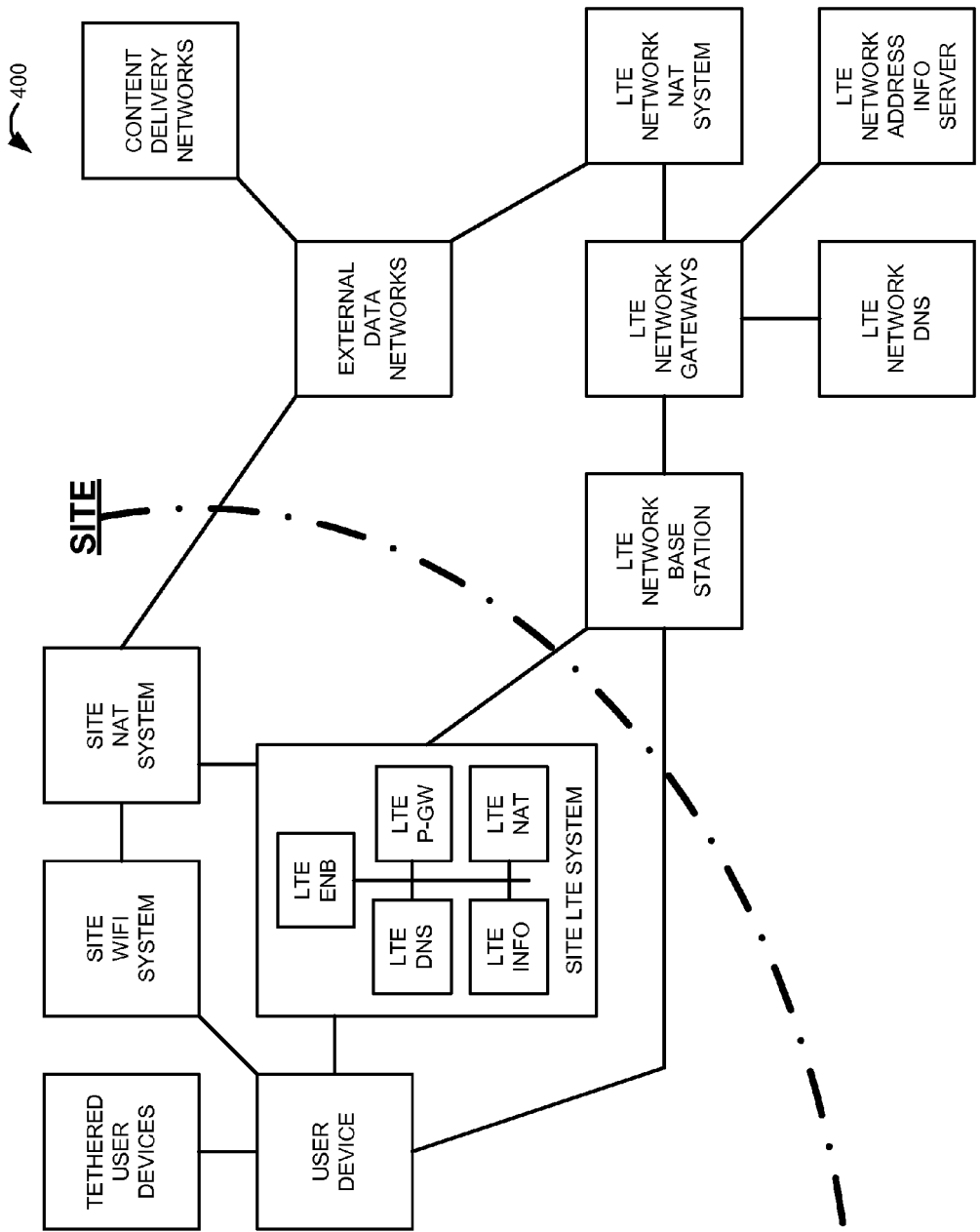
FIG. 4 illustrates an LTE network to discover and report IP address allocation and translation data for individual wireless communication devices in content delivery footprint information.

FIG. 4 illustrates communication network 400 to discover the network address allocations and translations used in wireless Long Term Evolution (LTE) systems. On FIG. 4, the SITE refers to a residence, business, school, government complex, or the like. The on-site systems include user devices, such as phones, computers, media players, and the like. The on-site systems also include Wifi, LTE, and NAT systems. The on-site Wifi systems include hotspots and IP routers. The on-site LTE systems include an eNodeB base station, local packet gateway, information servers, NAT, and DNS. The on-site NAT systems include firewalls and IP modems.

In operation, the user device is allocated internal IP addresses from at least: 1) the on-site NAT, 2) the LTE network NAT, and 3) the on-site LTE NAT. The user device transfers data communications over the wifi system, on-site LTE system, and LTE network using these internal IP addresses. The NAT systems and the external data networks transfer the data communications using associated external IP addresses. The NAT systems translate between the internal IP addresses and the external IP addresses to facilitate the data transfers.

The user device provides data tethers between various tethered user devices and the Wifi and/or LTE systems. The user device allocates internal IP addresses, such as port numbers from its own internal IP address, to the tethered user devices. The user device translates between these internal IP addresses to facilitate data transfers for the tethered user devices.

The LTE network address information server performs an on-going discovery process for the user device. The LTE network address information server transfers a DNS SRV request indicating the user device/domain to the LTE network DNS. The user device/domain may be pre-configured or obtained during host name configuration. The LTE network DNS processes the DNS SRV request to identify the various LTE network gateways that perform IP address allocation and/or translation for the user device. The LTE network DNS returns a DNS SRV response listing the LTE network gateways for the user device to the LTE network address information server.

The LTE network address information server transfers discovery requests for the user device to the gateways identified in the DNS SRV response. The LTE network gateways query the LTE network NAT system for the internal/external address prefixes used to translate IP traffic for the user device. The LTE network gateways determine the IP address allocation information for the user device including the allocation pool, protocol, criteria, and the like. The LTE network gateways return the IP address allocation and translation data for the user device to the LTE network address information server. The LTE network address information server transfers the IP address allocation and translation data to the user device for use in content delivery footprint information. The IP allocation information indicates the allocation protocol, such as DHCP, IPv4 Mobility, or IPv6 Mobility. The IP allocation criteria indicates items, such as locations, subnet masks, domain names, access point names, cell identifiers, base station identifiers, and/or some other IP networking data. The IP translation information associates the internal address pools and prefixes with the external addresses pools and prefixes.

Note that the DNS SRV translations may be managed to properly load balance and schedule the IP address discovery transactions on the LTE network gateways. For example, the domain _localcdni.<domain> can denote on-site members of a device cluster and another domain of _active.localcdni.<domain> can denote on-site members of the device cluster that can serve as the discovery proxy. The <domain> is configured in each device. Devices add themselves as members to these two domains as needed to trigger active discovery and proxy capabilities.

The user device also performs an on-going discovery process. The user device receives a broadcast from the on-site LTE system, such as an anycast or the like, that identifies the on-site NAT, the on-site LTE system, and the LTE network address information server for address information discovery.

The user device transfers discovery requests to the on-site NAT, the on-site LTE system, and the LTE network address information server identified in the broadcast (although the discovery data from the LTE network address information server may be pushed on a different schedule). The on-site NAT, the on-site LTE system, and the LTE network address information server return the IP address allocation and translation information to the user device.

For example, the user device (or its proxy—the on-site LTE network address information server) transfers discovery requests to the on-site LTE P-GW identified in the anycast. The on-site LTE P-GW gateways queries the on-site LTE NAT system for the address prefixes used to translate IP traffic for the user device. The on-site LTE P-GW determines the IP address allocation information for the user device including the allocation pool, protocol, criteria, and the like. The on-site LTE P-GW return the IP address allocation and translation data for the user device to the user device (or its proxy for transfer to the user device)

The user device processes the IP address allocation and translation information to generate content delivery footprint information. The content delivery footprint data indicates media content stored on the user device and various content metadata as well. The content delivery footprint information also indicates the IP address pools, protocols, criteria, prefixes, translations, and the like for the user device. The user device transfers the content delivery footprint information to the content delivery network over the site systems and/or the LTE network and the external data networks.

The user device acts as a discovery proxy for some of the tethered devices. Thus, the user device might access the on-site NAT, the on-site LTE system, and the LTE network address information server on behalf of select tethered devices to obtain and serve their IP address allocation and translation information. The content delivery footprint data for the user device indicates these tethered user devices and possibly additional footprint data for the tethered user devices.

Responsive to the discovery process, the on-site NAT, the on-site LTE P-GW, and the LTE network address information server push allocation and translation information updates to the user device for contemporaneous reflection in the footprint information.

Various data protocols could be implemented to for the discovery requests and responses. The IP protocol could be used to transport the discovery requests and responses and a mark-up language could be used to indicate the IP address information. In some examples, the Port Control Protocol (PCP) is used for the discovery requests and responses, although alternatives to PCP could be used.

The Port Control Protocol (PCP) may be adapted to operate in the context described herein. Like the PREFIX64 option to the MAP opcode, a PREFIX44 option to the MAP opcode could be used to retrieve the internal IPv4 prefixes for a given device or domain. Likewise, a PREFIX66 option to the MAP opcode could be used to retrieve the internal IPv6 prefixes for a given device or domain.

The PCP response code ALLOC may be used indicate the allocation protocols, criteria, and other data in response to a MAP opcode with the ALLOC option. The PCP response code TRANS may be used indicate the internal address pool/prefix size and the external address pool/prefix size in response to a MAP opcode with the TRANS option. The PCP third party option and an authorization server may be used to establish trust between PCP server/client systems using security challenges. The PCP ANNOUNCE opcode can be used to push IP address allocation and translation updates.

Figure 5:
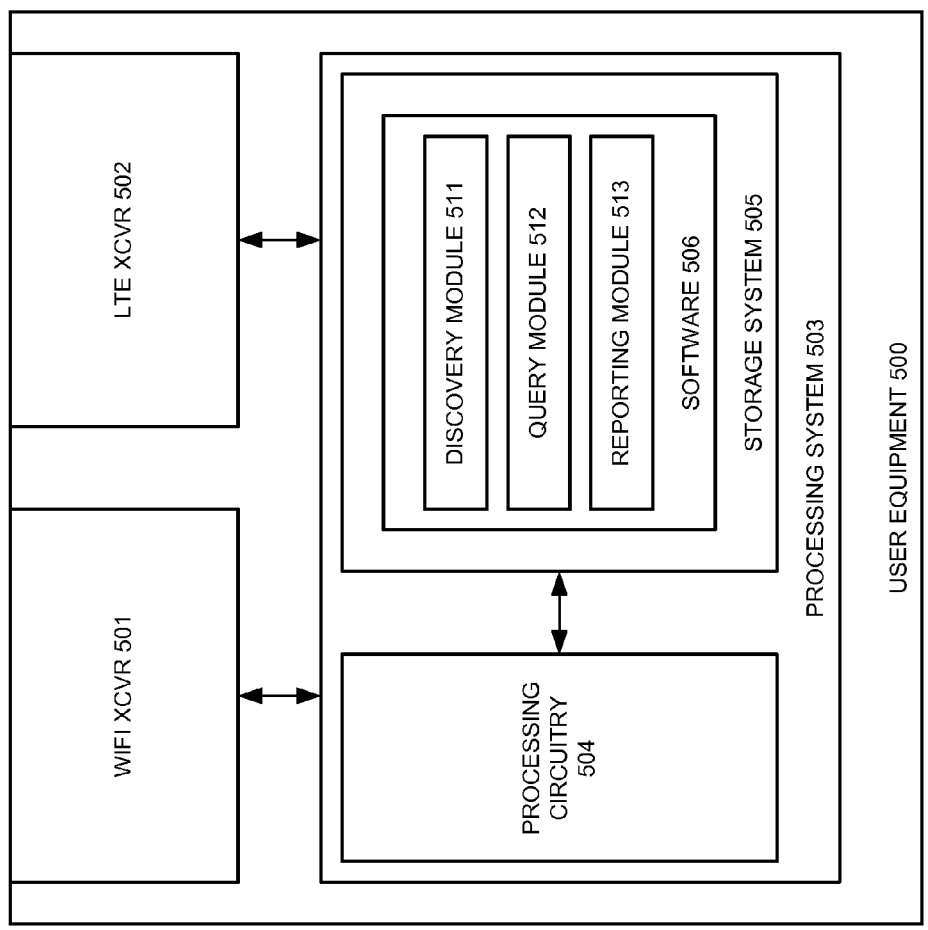
FIG. 5 illustrates User Equipment to discover and report IP address allocation and translation data in content delivery footprint information.

FIG. 5 illustrates User Equipment (UE) 500 to discover and report IP address allocation and translation data in content delivery footprint information. UE 500 is an example of wireless communication devices 101-103 and the user devices of FIG. 4, although these devices may use alternative configurations and operations. UE 500 comprises Wifi transceiver 501, LTE transceiver 502, and processing system 503. Processing system 503 comprises processing circuitry 504 and storage system 505. Storage system 505 stores software 506. Software 506 includes software modules 511-513. Some conventional aspects of UE 500 are omitted for clarity, such as power supplies, enclosures, and the like. UE 500 may be centralized or distributed and may include various virtualized components.

Wifi transceiver 501 comprises wireless Wifi communication components, such as antennas, amplifiers, filters, modulators, and the like. LTE transceiver 602 comprises LTE communication components, such as such as antennas, amplifiers, filters, modulators, and the like. In processing system 503, processing circuitry 504 comprises circuit boards, integrated circuitry, and associated electronics. Storage system 505 comprises non-transitory, machine-readable, data storage media, such as flash drives, disc drives, memory circuitry, servers, and the like. Software 506 comprises machine-readable instructions that control the operation of processing circuitry 504 when executed. Software 506 includes software modules 511-513 and may also include operating systems, applications, data structures, utilities, databases, and the like. All or portions of software 506 may be externally stored on one or more storage media, such as flash drives, discs, servers, and the like.

When executed by processing circuitry 504, discovery module 511 directs circuitry 504 to transfer DNS SRV queries using an internally configured domain to identify the network elements to query for IP address allocation and translation information. When executed by processing circuitry 504, query module 512 directs circuitry 504 to transfer PCP messaging using the ALLOC, TRANS, and PREFIX codes and options to the network elements in the DNS SRV response to identify IP address allocation and translation information. When executed by processing circuitry 504 reporting module 513 directs circuitry 504 to generate and transfer content delivery footprint data indicating hosted content and the IP address allocation and translation information.

Figure 6:
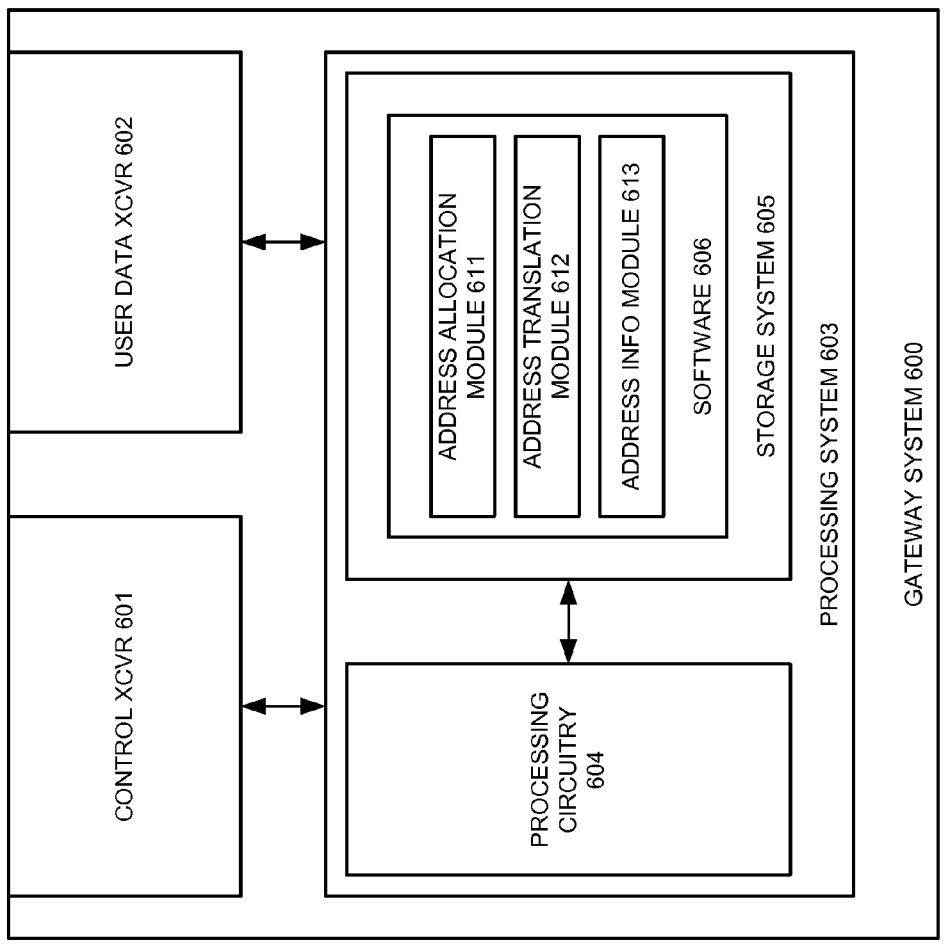
FIG. 6 illustrate a gateway system to discover and report IP address allocation and translation data for individual wireless communication devices in content delivery footprint information.

FIG. 6 illustrates gateway system 600 to discover and report IP address allocation and translation data for UEs. Gateway system 600 is an example of gateway systems 119 and the gateways of FIG. 4, although these gateways may use alternative configurations and operations. Gateway system 600 comprises control transceiver 601, user data transceiver 602, and processing system 603. Processing system 603 comprises processing circuitry 604 and storage system 605. Storage system 605 stores software 606. Software 606 includes software modules 611-613. Some conventional aspects of gateway system 600 are omitted for clarity, such as power supplies, enclosures, and the like. Gateway system 600 may be centralized or distributed and may include various virtualized components.

Control transceiver 601 comprises communication signaling components, such as ports, signal processors, PCP software, and the like. User data transceiver 602 comprises communication components, such as such as ports, signal processors, IP software, and the like. In processing system 603, processing circuitry 604 comprises circuit boards, integrated circuitry, and associated electronics. Storage system 605 comprises non-transitory, machine-readable, data storage media, such as flash drives, tape drives, disc drives, memory circuitry, servers, and the like. Software 606 comprises machine-readable instructions that control the operation of processing circuitry 604 when executed. Software 606 includes software modules 611-613 and may also include operating systems, applications, data structures, utilities, databases, and the like. All or portions of software 606 may be externally stored on one or more storage media, such as flash drives, discs, servers, and the like.

When executed by processing circuitry 604, address allocation module 611 directs circuitry 604 to allocate IP addresses to UEs based on and allocation scheme and criteria. When executed by processing circuitry 604, address translation module 612 directs circuitry 604 to translate between internal and external IP addresses including prefix modifications and IP protocol switching. When executed by processing circuitry 604 address information module 613 directs circuitry 604 to process PCP messaging having using the ALLOC, TRANS, and PREFIX codes and options to identify IP address allocation and translation information for individual UEs and/or UE domains.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication network comprising:
   allocating internal Internet Protocol (IP) addresses to wireless communication devices and translating between external IP addresses and the internal IP addresses to transfer data communications between the wireless communication devices and data communication systems;
   receiving discovery requests for the wireless communication devices, and in response, transferring discovery responses describing the IP address allocations and translations for individual ones of the wireless communication devices;
   receiving content delivery footprint data indicating the IP address allocations and translations for the wireless communication devices; and
   transferring the content delivery footprint data indicating the IP address allocations and translations for the wireless communication devices for delivery to a content distribution network.

2. The method of claim 1 wherein:
   translating between the external IP addresses and the internal IP addresses comprises translating network prefixes of the internal IP addresses;
   transferring the discovery responses comprises indicating individual ones of the network prefixes associated with the individual ones of the wireless communication devices;
   receiving and transferring the content delivery footprint data comprises receiving and transferring the individual ones of the network prefixes associated with the individual ones of the wireless communication devices.

3. The method of claim 1 wherein:
   a set of the external IP addresses comprises external IP Version 4 (IPv4) addresses and allocating the internal IP addresses comprises allocating IP Version 6 (IPv6) addresses;
   translating between the external IPv4 addresses and the internal IPv6 addresses comprises adding internal IPv6 network prefixes to the external IPv4 addresses;
   transferring the discovery responses comprises indicating the internal IPv6 network prefixes and the external IPv4 addresses for the individual ones of the wireless communication devices; and
   receiving and transferring the content delivery footprint data comprises receiving and transferring the internal IPv6 network prefixes and the external IPv4 addresses for the individual ones of the wireless communication devices.

4. The method of claim 1 wherein:
   a set of the external IP addresses comprises external IP Version 4 (IPv4) addresses and allocating the internal IP addresses comprises allocating IPv4 addresses;
   translating between the external IPv4 addresses and the internal IPv4 addresses comprises translating between external IPv4 network prefixes and internal IPv4 network prefixes;
   transferring the discovery responses comprises indicating the internal IPv4 network prefixes and the external IPv4 addresses associated with the individual ones of the wireless communication devices; and
   receiving and transferring the content delivery footprint data comprises receiving and transferring the internal IPv4 network prefixes and the external IPv4 addresses associated with the individual ones of the wireless communication devices.

5. The method of claim 1 wherein:
   a set of the external IP addresses comprises external IP Version 6 (IPv6) addresses and allocating the internal IP addresses comprises allocating IPv6 addresses;
   translating between the external IPv6 addresses and the internal IPv6 addresses comprises translating between external IPv6 prefixes and internal IPv6 prefixes;
   transferring the discovery responses comprises individually indicating the internal IPv6 prefixes and the external IPv6 addresses associated with the individual ones of the wireless communication devices; and
   receiving and transferring the content delivery footprint data comprises receiving and transferring the internal IPv6 prefixes and the external IPv6 addresses associated with the individual ones of the wireless communication devices.

6. The method of claim 1 wherein receiving the discovery requests comprises:
   identifying associated network element sets for individual ones of the wireless communication devices;
   indicating the associated network element sets for the individual ones of the wireless communication devices; and
   transferring the discovery requests for the individual ones of the wireless communication devices to their associated network element sets.

7. The method of claim 1 wherein receiving the discovery requests comprises:
   receiving Domain Name Service (DNS) SRV requests for individual ones of the wireless communication devices;
   translating the DNS SRV requests into associated network element sets for the individual ones of the wireless communication devices;
   transferring DNS SRV responses indicating the associated network element sets to the individual ones of the wireless communication devices; and
   receiving the discovery requests from the individual ones of the wireless communication devices into their associated network element sets.

8. The method of claim 1 wherein receiving the discovery requests comprises receiving Port Control Protocol (PCP) commands.

9. The method of claim 1 wherein transferring the discovery responses comprises transferring Port Control Protocol (PCP) results.

10. The method of claim 1 wherein allocating and translating the internal IP addresses comprises allocating and translating the internal IP addresses in a Long Term Evolution (LTE) gateway system.

11. A wireless communication network comprising:
a gateway system configured to allocate internal Internet Protocol (IP) addresses to wireless communication devices, translate between external IP addresses and the internal IP addresses to transfer data communications for the wireless communication devices, process discovery requests for the wireless communication devices to transfer discovery responses describing the IP address allocations and translations for individual ones of the wireless communication devices;
a wireless access system configured to transfer the data communications for the wireless communication devices, transfer the discovery responses to individual ones of the wireless communication devices, and receive content delivery footprint data from the individual ones of the wireless communication devices indicating the IP address allocations and translations for the wireless communication devices; and
the gateway system configured to transfer the content delivery footprint data indicating the IP address allocations and translations for the wireless communication devices for delivery to a content distribution network.

12. The wireless communication network of claim 11 wherein the gateway system is configured to:
translate network prefixes of the internal IP addresses;
transfer the discovery responses to indicate individual ones of the network prefixes associated with the individual ones of the wireless communication devices; and
transfer the content delivery footprint data indicating the individual ones of the network prefixes associated with the individual ones of the wireless communication devices.

13. The wireless communication network of claim 11 wherein:
the internal IP addresses comprise Internet Protocol Version 6 (IPv6) addresses and the external IP addresses comprise Internet Protocol Version 4 (IPv4) addresses;
the discovery responses and the content delivery footprint data indicate the internal IPv6 network prefixes and the external IPv4 addresses for the individual ones of the wireless communication devices; and
the gateway system is configured to add internal IPv6 network prefixes to the external IPv4 addresses to translate between the internal IPv6 addresses and the external IPv4 addresses.

14. The wireless communication network of claim 11 wherein:
the internal IP addresses and the external IP addresses comprise Internet Protocol Version (IPv4) addresses;
the discovery responses and the content delivery footprint data indicate internal IPv4 network prefixes and the external IPv4 addresses for the individual ones of the wireless communication devices; and
the gateway system is configured to add the internal IPv4 network prefixes to the external IPv4 addresses to translate between the internal IPv4 addresses and the external IPv4 addresses.

15. The wireless communication network of claim 11 wherein:
the internal IP addresses and the external IP addresses comprise Internet Protocol Version (IPv6) addresses;
the discovery responses and the content delivery footprint data indicate internal IPv6 network prefixes and the external IPv6 addresses for the individual ones of the wireless communication devices; and
the gateway system is configured to add the internal IPv6 network prefixes to the external IPv6 addresses to translate between the internal IPv6 addresses and the external IPv6 addresses.

16. The wireless communication network of claim 11 wherein the gateway system is configured to:
identify associated network element sets for individual ones of the wireless communication devices;
indicate the associated network element sets for the individual ones of the wireless communication devices; and
transfer the discovery requests for the individual ones of the wireless communication devices to their associated network element sets.

17. The wireless communication network of claim 11 the gateway system is configured to:
receive Domain Name Service (DNS) SRV requests for individual ones of the wireless communication devices;
translate the DNS SRV requests into associated network element sets for the individual ones of the wireless communication devices;
transfer DNS SRV responses indicating the associated network element sets for the individual ones of the wireless communication devices; and
transfer the discovery requests for the individual ones of the wireless communication devices to their associated network element sets.

18. The wireless communication network of claim 11 wherein the gateway system is configured to receive the discovery requests as Port Control Protocol (PCP) commands.

19. The wireless communication network of claim 11 wherein the gateway system is configured to transfer the discovery responses as PCP results.

20. The wireless communication network of claim 11 wherein the gateway system comprises a Long Term Evolution (LTE) gateway system.

* * * * *